(12) United States Patent
Ohtsu et al.

(10) Patent No.: US 8,526,135 B2
(45) Date of Patent: Sep. 3, 2013

(54) MAGNETIC HEAD TRACKING CONTROL METHOD, SERVO SIGNAL VERIFICATION METHOD, MAGNETIC TAPE DRIVE, AND SERVO WRITER

(75) Inventors: Hiroki Ohtsu, Odawara (JP); Yuichi Kurihashi, Odawara (JP); Kazuyuki Shiino, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 204 days.

(21) Appl. No.: 13/220,991

(22) Filed: Aug. 30, 2011

(65) Prior Publication Data

US 2012/0050910 A1 Mar. 1, 2012

(30) Foreign Application Priority Data

Aug. 31, 2010 (JP) ................................. 2010-194452

(51) Int. Cl.
*G11B 5/584* (2006.01)
(52) U.S. Cl.
USPC ........................................ 360/77.12; 360/75
(58) Field of Classification Search
USPC .................................. 360/77.12, 75
See application file for complete search history.

(56) References Cited

U.S. PATENT DOCUMENTS

| | | | |
|---|---|---|---|
| 7,551,380 B2 | 6/2009 | Watson et al. | |
| 2004/0160697 A1* | 8/2004 | Nakao et al. | 360/77.13 |
| 2004/0265635 A1 | 12/2004 | Ishiguro | |
| 2005/0041324 A1* | 2/2005 | Tateishi et al. | 360/77.12 |
| 2005/0052779 A1* | 3/2005 | Nakao et al. | 360/77.12 |
| 2005/0105967 A2* | 5/2005 | Nakao | 403/408.1 |
| 2007/0115581 A1* | 5/2007 | Bui et al. | 360/77.12 |
| 2007/0223125 A1* | 9/2007 | Ohtsu | 360/75 |
| 2008/0180834 A1* | 7/2008 | Fujita et al. | 360/77.12 |
| 2009/0296269 A1* | 12/2009 | Fujita et al. | 360/77.12 |

FOREIGN PATENT DOCUMENTS

| | | |
|---|---|---|
| JP | 2005-025820 | 1/2005 |
| JP | 2009-020943 | 1/2009 |

* cited by examiner

*Primary Examiner* — Thang Tran
(74) *Attorney, Agent, or Firm* — Sughrue Mion, PLLC

(57) ABSTRACT

A servo signal in which a magnetic pattern composed of a first portion magnetized in one direction that is one of two opposite thickness directions and a second portion magnetized in a direction opposite to the one direction is repeatedly arranged in a longitudinal direction of the tape at predetermined intervals is read out and a waveform of the servo signal is acquired from the readout servo signal. In the acquired waveform of the servo signal, a unit waveform having a pair of peaks of opposite polarities corresponding to the magnetic pattern appears periodically. A crest or trough portion of the waveform containing one of the peaks located rearwardly in the tape transport direction in a time of writing the servo signal is selected from the unit waveform contained in the acquired waveform of the servo signal. Tracking control or servo signal verification is performed based on the selected portion.

5 Claims, 6 Drawing Sheets

MAGNETIC HEAD TRACKING CONTROL METHOD, SERVO SIGNAL VERIFICATION METHOD, MAGNETIC TAPE DRIVE, AND SERVO WRITER

CROSS-REFERENCE TO RELATED APPLICATION(S)

This application claims priority from Japanese Patent Application No. 2010-194452, filed on Aug. 31, 2010 in the Japan Patent Office, the disclosure of which is herein incorporated by reference in its entirety.

BACKGROUND

1. Field

One or more aspects of the present invention relate to a magnetic head tracking control method, a servo signal verification method, a magnetic tape drive, and a servo writer.

2. Description of Related Art

In accordance with the trend toward higher recording density in the realm of information storage technologies, the data tracks of a magnetic tape designed in recent years should have extremely narrow widths. To enable the magnetic head to precisely follow such a narrow data track, a servo signal indicating a reference position of the data track is written beforehand in the magnetic tape. In a magnetic tape drive which records or retrieves data in the magnetic tape, a track-following servo control is exercised in which the servo signal recorded in advance is read out to work out an amount of deviation in position between the data track in which data is just to be recorded or retrieved and the magnetic head so that the magnetic head is regulated based on the amount of shift in position to follow the data track.

Such a servo signal is formed by writing a servo pattern at predetermined intervals in the direction of transport of a magnetic tape. In a magnetic tape for use in perpendicular magnetic recording (i.e., the magnetic tape in which a magnetic material contained in the magnetic tape is magnetized in a thickness direction of the magnetic tape to thereby record information), for example, the servo pattern may include a first portion magnetized in one direction of two opposite thickness directions of the magnetic tape, and a second portion magnetized in a direction opposite to the one direction. See JP 2009-20943 A, for example.

In a servo writer for writing a servo signal, a servo signal is written by a fixed servo signal write head in a magnetic tape that is being transported. Therefore, in order to accurately write a servo signal in the magnetic tape, the magnetic tape is transported with extremely high accuracy in position so that the magnetic tape being transported does not wobble from side to side or subject to change in transport speed. However, in actuality, the servo signal written in the magnetic tape being transported is inevitably subject to undesirable variations (fluctuation) in a direction of transport of the magnetic tape due to fluctuation in current-carrying time of the pulsed signal (recording current for each pulse) outputted to the servo signal write head and variation in tension of the magnetic tape.

The present invention has been made in an attempt to eliminate the above disadvantages, and illustrative, non-limiting embodiments of the present invention may overcome the above disadvantages and other disadvantages not described above.

SUMMARY

It is one aspect of the present invention to provide a magnetic head tracking control method, a servo signal verification method, a magnetic tape drive, and a servo writer in which the adverse effects of fluctuation in the direction of transport of a magnetic tape (hereinafter referred to as "tape transport direction") during a servo signal writing operation can be suppressed.

When a servo signal in which a magnetic pattern composed of a first portion magnetized in one direction that is one of two opposite thickness directions and a second portion magnetized in a direction opposite to the one direction is repeatedly arranged in a longitudinal direction of the magnetic tape at predetermined intervals is read out, a waveform in which a unit waveform having a pair of peaks of opposite polarities corresponding to the magnetic pattern appears periodically is obtained (see FIG. 3B). The assiduous study conducted by the present named inventors and their colleagues has shown that one of the peaks located rearwardly in the tape transport direction in the time of writing the servo signal varies less in position of the peak in the time of reading out the servo signal, than the other of the peaks located frontwardly. Such less variation in position of the peak indicates that magnetic recording has been done more uniformly and more consistently in the magnetic tape, and the detrimental effect of fluctuation in the tape transport direction during the servo signal writing operation has been reduced.

With this in view, more specifically, a tracking control method for causing a magnetic head to follow a perpendicular recording-type magnetic tape (a magnetic tape for use in perpendicular magnetic recording) with a servo signal written therein is disclosed according to one method aspect of the present invention. In the servo signal, a magnetic pattern composed of a first portion magnetized in one direction that is one of two opposite thickness directions and a second portion magnetized in a direction opposite to the one direction is repeatedly arranged in a longitudinal direction of the magnetic tape at predetermined intervals. The method comprises the steps of: reading out the servo signal and acquiring, from the readout servo signal, a waveform of the servo signal in which a unit waveform having a pair of peaks of opposite polarities corresponding to the magnetic pattern appears periodically, the unit waveform being composed of a crest portion and a trough portion; selecting, from between the crest portion and the trough portion of the unit waveform contained in the acquired waveform of the servo signal, a portion of the waveform containing one of the peaks located rearwardly in a tape transport direction in a time of writing the servo signal; and regulating a position of the magnetic head based on the selected portion of the waveform.

With this method, the effect of fluctuation in the tape transport direction, which occurs during the servo signal writing operation, on the tracking control for the magnetic head can be suppressed effectively, because the portion of the waveform containing one of the peaks that varies less in its position is selected from the waveform acquired from the readout servo signal and is used for the position control by which the position of the magnetic head is regulated. Accordingly, the tracking control can be exercised with increased accuracy and stability.

The perpendicular recording-type magnetic tape (i.e., a magnetic tape for use in perpendicular magnetic recording) in this configuration may preferably but not necessarily have a high squareness (hereinafter referred to as "perpendicular SQ"), that is the ratio of a perpendicular component of magnetization (i.e., the component of magnetic material whose magnetic pole orients in the thickness direction of the magnetic tape); for example, the perpendicular SQ not less than 0.5 may be preferable. The SQ value mentioned herein is a value after demagnetizing field correction.

In another method aspect, a method for verifying quality of a servo signal written in a perpendicular recording-type magnetic tape, in which servo signal a magnetic pattern is repeatedly arranged in a longitudinal direction of the magnetic tape at predetermined intervals, the magnetic pattern being composed of a first portion magnetized in one direction that is one of two opposite thickness directions and a second portion magnetized in a direction opposite to the one direction is disclosed. This method comprises the steps of: reading out the servo signal and acquiring, from the readout servo signal, a waveform of the servo signal in which a unit waveform having a pair of peaks of opposite polarities corresponding to the magnetic pattern appears periodically, the unit waveform being composed of a crest portion and a trough portion; selecting, from between the crest portion and the trough portion of the unit waveform contained in the acquired waveform of the servo signal, a portion of the waveform containing one of the peaks located rearwardly in a tape transport direction in a time of writing the servo signal; and verifying the quality of the servo signal based on the selected portion of the waveform.

With this method, the quality of the servo signal can be verified, with the effect of fluctuation in the tape transport direction (which occurs during the servo signal writing operation) suppressed effectively, because the portion of the waveform containing one of the peaks that varies less in its position is selected from the waveform acquired from the readout servo signal and is used for verifying the quality of the servo signal. Accordingly, the verification of the servo signal can be performed with increased accuracy.

In yet another method aspect, a tracking control method for causing a magnetic head to follow a perpendicular recording-type magnetic tape with a servo signal written therein is disclosed. In this servo signal a magnetic pattern having a first portion magnetized in one direction that is one of two opposite thickness directions and a second portion magnetized in a direction opposite to the one direction is repeatedly arranged in a longitudinal direction of the magnetic tape. The method comprises the steps of: acquiring a position of one of the first portion and the second portion located rearwardly in a tape transport direction in a time of writing the servo signal; and regulating a position of the magnetic head based on the position of the one of the first portion and the second portion acquired.

With this method, the effect of fluctuation in the tape transport direction, which occurs during the servo signal writing operation, on the tracking control for the magnetic head can be suppressed effectively, because the portion of the magnetic pattern containing the acquired position that is shifted less is selected from the servo signal written in the magnetic tape and is used for the position control by which the position of the magnetic head is regulated. Accordingly, the tracking control can be exercised with increased accuracy and stability.

In one apparatus aspect, a magnetic tape drive for recording and/or retrieving information in a perpendicular recording-type magnetic tape with a servo signal written therein is disclosed. In the servo signal, a magnetic pattern composed of a first portion magnetized in one direction that is one of two opposite thickness directions and a second portion magnetized in a direction opposite to the one direction is repeatedly arranged in a longitudinal direction of the magnetic tape at predetermined intervals. This magnetic tape drive comprises a magnetic head, a waveform acquisition unit, a waveform selection unit, and a position control unit. The magnetic head includes a first element configured to record and/or retrieve information in the perpendicular recording-type magnetic tape, and a second element configured to read out the servo signal. The waveform acquisition unit is configured to acquire, from the servo signal read out by the second element, a waveform of the servo signal in which a unit waveform having a pair of peaks of opposite polarities corresponding to the magnetic pattern appears periodically. The unit waveform is composed of a crest portion and a trough portion. The waveform selection unit is configured to select, from between the crest portion and the trough portion of the unit waveform contained in the waveform of the servo signal acquired by the waveform acquisition unit, a portion of the waveform containing one of the peaks located rearwardly in a tape transport direction in a time of writing the servo signal. The position control unit is configured to regulate a position of the magnetic head based on the crest or trough portion of the waveform selected by the waveform selection unit.

With this magnetic tape drive, the above-described tracking control method (for causing a magnetic head to follow a perpendicular recording-type magnetic tape) can be performed, and thus the effect of fluctuation in the tape transport direction, which occurs during the servo signal writing operation, on the tracking control for the magnetic head can be suppressed effectively, so that the tracking control can be exercised with increased accuracy and stability.

In another apparatus aspect, a servo writer for writing a servo signal in a perpendicular recording-type magnetic tape is disclosed. In the servo signal, a magnetic pattern composed of a first portion magnetized in one direction that is one of two opposite thickness directions and a second portion magnetized in a direction opposite to the one direction is repeatedly arranged in a longitudinal direction of the magnetic tape at predetermined intervals. The servo writer comprises a write head, a signal output unit, a read head, a waveform acquisition unit, a waveform selection unit, and a signal verification unit. The write head is configured to write the servo signal in the perpendicular recording-type magnetic tape. The signal output unit is configured to output a pulsed signal to the write head. The read head is provided in a position downstream relative to the write head along a path traveled by the perpendicular recording-type magnetic tape, and is configured to read out a servo signal. The waveform acquisition unit is configured to acquire, from the servo signal read out by the read head, a waveform of the servo signal in which a unit waveform having a pair of peaks of opposite polarities corresponding to the magnetic pattern appears periodically. The unit waveform is composed of a crest portion and a trough portion. The waveform selection unit is configured to select a portion of the waveform containing one of the peaks located rearwardly in a tape transport direction in a time of writing the servo signal, from between the crest portion and the trough portion of the unit waveform contained in the waveform of the servo signal acquired by the waveform acquisition unit. The signal verification unit is configured to verify a quality of the servo signal based on the crest or trough portion of the waveform selected by the waveform selection unit.

With this servo writer, the above-described servo signal verification method (for verifying quality of a servo signal written in a perpendicular recording-type magnetic tape) can be performed, and thus the quality of the servo signal can be verified, with the effect of fluctuation in the tape transport direction (which occurs during the servo signal writing operation) suppressed effectively, so that the verification of the servo signal can be performed with increased accuracy.

In accordance with one or more aspects of the present invention, the portion of the waveform containing one of the peaks that varies less in its position is selected from the waveform acquired from the readout servo signal and is used for the position control by which the position of the magnetic head is regulated or for verification of the quality of the servo signal, and thus the effect of fluctuation in the tape transport direction on the tracking control or the quality verification can be suppressed effectively.

BRIEF DESCRIPTION OF THE DRAWINGS

The above aspects, other advantages and further features of the present invention will become more apparent by describing in detail illustrative, non-limiting embodiments thereof with reference to the accompanying drawings, in which.

DETAILED DESCRIPTION OF THE EMBODIMENTS

Illustrative embodiments of the present invention will be described in detail with reference to the accompanying drawings.

First Embodiment

Referring now to FIGS. 1-4, a detailed description of a first embodiment will be given hereafter to illustrate a servo writer and a servo signal verification method configured in accordance with the embodiment. In the following description, the tape transport direction (a direction in which a magnetic tape is transported) refers to a longitudinal direction of the magnetic tape, and the thickness direction refers to a direction of the thickness of the magnetic tape.

Figure 1:
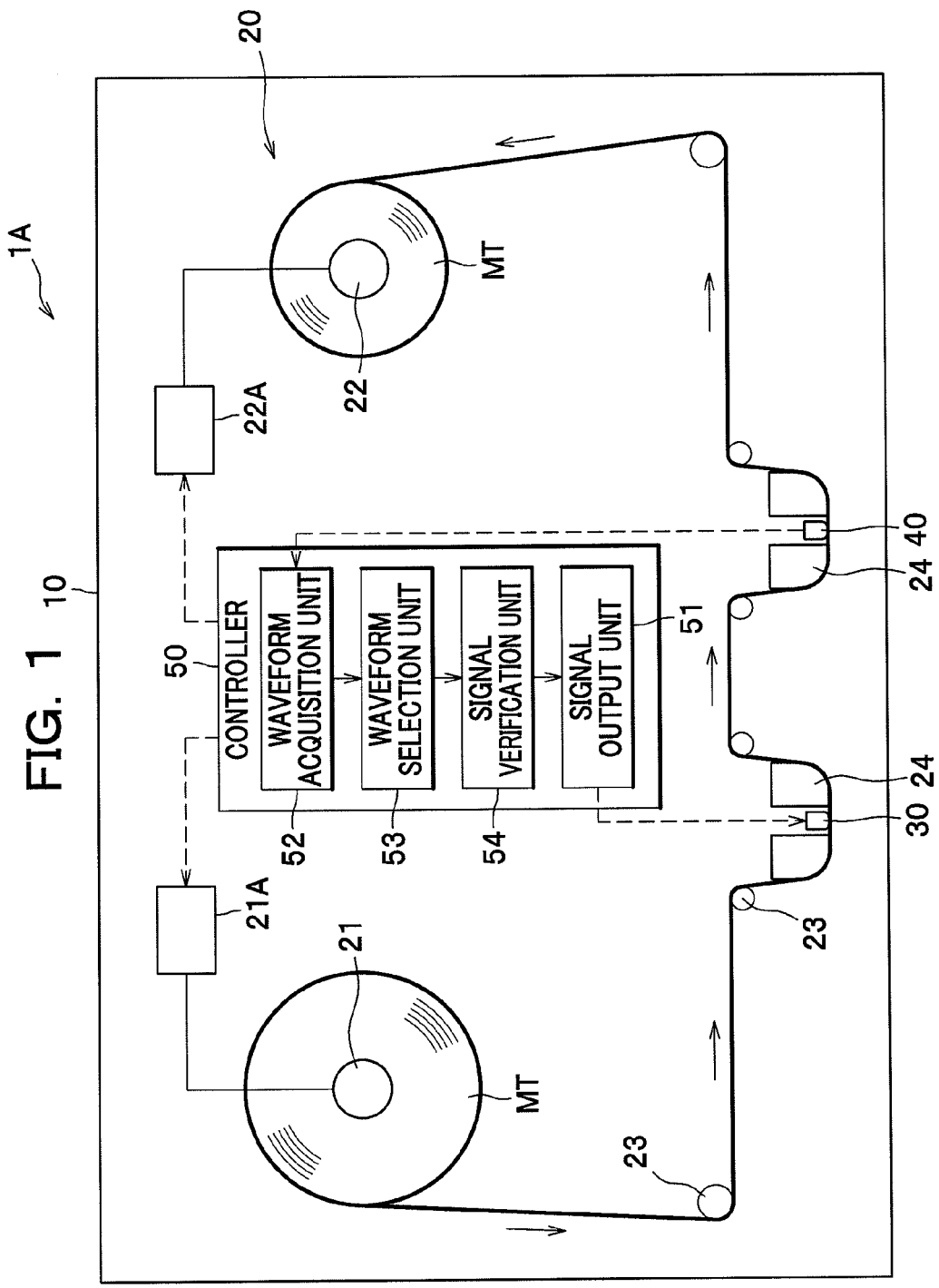
FIG. 1 is a schematic diagram showing a structure of a servo writer.

A servo writer 1A is a device designed to write a servo signal in a magnetic tape MT. As shown in FIG. 1, the servo writer 1A mainly includes a base 10 and various components mounted on the base 10, which include a magnetic tape transport system 20, a write head 30, a read head 40, and a controller 50.

Here, a magnetic tape MT configured in accordance with the present embodiment will be described at the outset.

Figure 2:
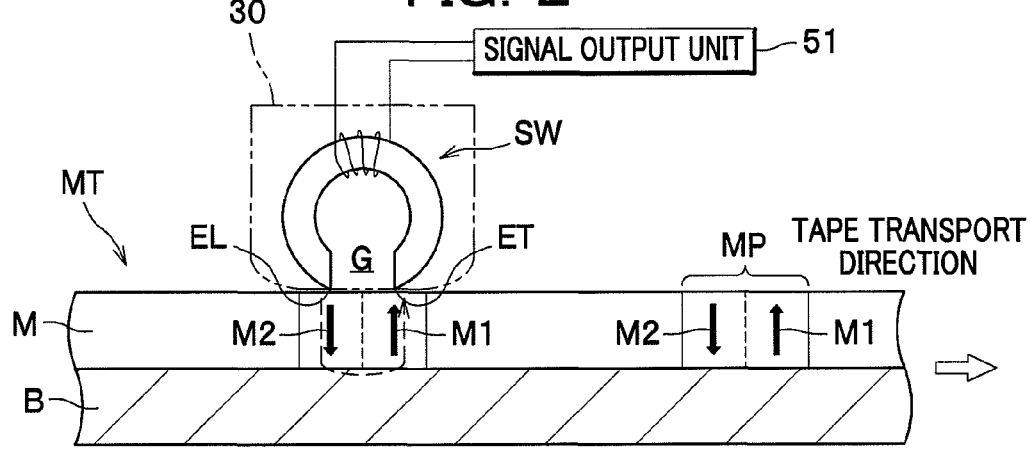
FIG. 2 is a schematic diagram for explaining a servo signal writing operation.

As shown in FIG. 2, the magnetic tape MT principally includes a base film B, and a magnetic layer M formed on the base film B. The magnetic tape MT is a recording medium for use in perpendicular magnetic recording; i.e., a magnetic material (magnetic dipole) contained in the magnetic layer M is magnetized in the thickness direction (upward/downward direction in FIG. 2), so that a servo signal or data (information) is written in the magnetic tape MT. The perpendicular SQ may preferably be 0.5 or greater.

The base film B is a supporting member for supporting the magnetic layer M. Examples of the base film B include a film made of polyethylene terephthalate (PET), etc.

The magnetic layer M is formed by applying magnetic coating composed of a mixture of magnetic material powder, a binder, etc. onto the base film B, and drying the magnetic coating. The magnetic layer M includes a servo band SB that is an area in which a servo signal (servo pattern SP) is written, and a data band DB that is an area in which data is recorded (see FIG. 6). Before a servo signal or data is written in the magnetic layer M, the magnetic layer M in its entirety is in a magnetically non-oriented state (i.e., not magnetized) which may be created by a known alternating-current erasing process, for example.

In the present embodiment, the magnetic material and the binder which make up the magnetic layer M may be of any type, without limitation, as long as it is suitable for perpendicular magnetic recording. The magnetic layer M may further contain a carbon black, an abrasive and/or a lubricant known in the art. Moreover, the magnetic tape MT consistent with the present embodiment may include a non-magnetic layer and/or a back coat layer known in the art.

Referring back to FIG. 1, the magnetic tape transport system 20 mainly includes a supply reel 21, a take-up reel 22, a plurality of guide rollers 23 and a plurality of tape guides 24. On the supply reel 21, a magnetic tape MT in which no servo signal has been written therein is wound up. The magnetic tape MT with a servo signal written therein is to be wound up on the take-up reel 22. The guide rollers 23 and the tape guides 24 are configured to guide the magnetic tape MT from the supply reel 21 to the take-up reel 22. The supply reel 21 is driven to rotate by a supply motor 21A. The take-up reel 22 is driven to rotate by a take-up motor 22A. In operation, a magnetic tape MT having no servo signal written therein is wound off the supply reel 21, guided by the guide rollers 23 and the tape guides 24 to run across the write head 30 that writes a servo signal therein, and wound up on the take-up reel 22.

The write head 30 is a magnetic head configured to write a servo signal in a magnetic tape MT. A servo signal write element SW is disposed in the write head 30, in a position corresponding to the servo band SB (an area to be defined as a servo band SB after a servo signal is written) of the magnetic tape MT (see FIG. 6).

As shown in FIG. 2, the servo signal write element SW is a known element having a magnetic gap G formed as an opening which extends in the tape transport direction. In this servo signal write element SW, when a unipolar-pulse signal is outputted from the signal output unit 51 to the servo signal write element SW, a leakage flux (see broken lines) is produced from the magnetic gap G whereby a magnetic pattern MP composed of a portion magnetized in one direction that is one of two opposite thickness directions (a rear component M2) and a portion magnetized in the other direction opposite to the one direction (a front component M1) is formed in the magnetic layer M.

To be more specific, in the servo signal write element SW, the magnetic gap G is formed by a core (not shown) having a leading edge EL and a trailing edge ET located upstream and downstream, respectively, in the tape transport direction, and the magnetic layer M is magnetized by a magnetic field produced at the leading edge in one direction (downward direction in FIG. 2) that is one of two thickness directions while the magnetic layer M is further magnetized by a magnetic field produced at the trailing edge in the other direction (upward direction in FIG. 2) that is a direction opposite to the one direction. In other words, of the components M1, M2 which make up the magnetic pattern MP, the front component M1 is written by the magnetic field produced at the trailing edge ET and the rear component M2 is written by the magnetic field produced at the leading edge EL.

In the servo writer 1A, the signal output unit 51 outputs a pulsed signal to the write head 30 with an appropriate timing, so that a servo signal with servo patterns SP repeatedly formed at predetermined intervals in the tape transport direction is written in the running magnetic tape MT. Although the shape of the servo pattern SP consistent with the present invention is not limited to any specific shape, the present embodiment is described with a no-parallel set of stripes (see FIG. 6) formed repeatedly at predetermined intervals in the tape transport direction by way of example.

Figure 3A:
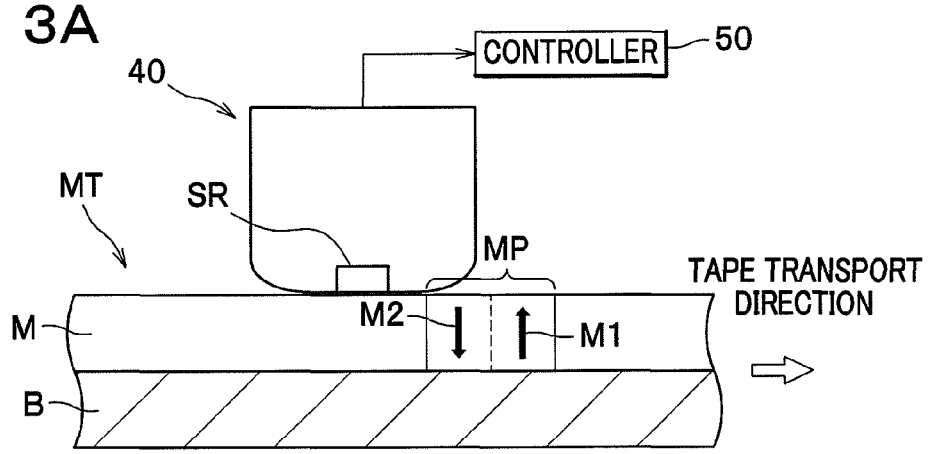
FIG. 3A is a schematic diagram for explaining a servo signal reading operation.

The read head 40 is a magnetic head (a magnetoresistive or MR head, in this embodiment) for reading a servo signal, and is disposed downstream relative to the write head 30 in the tape transport direction. In the read head 40, as shown in FIG. 3A, a servo signal read element SR is disposed at a position corresponding to the position of the servo band SB (see FIG. 6). The servo signal read element SR is an MR element for detecting magnetic flux perpendicular to the surface of the magnetic tape MT (whose line of magnetic induction orients in the thickness direction of the magnetic tape MT).

As shown in FIG. 1, the controller 50 is configured to control the overall operation of the servo writer 1A, and includes several functional units related to the inventive features of the present embodiment, such as a signal output unit 51, a waveform acquisition unit 52, a waveform selection unit 53 and a signal verification unit 54.

The signal output unit 51 is configured to output a pulsed signal (recording current) for writing a servo pattern MP (servo signal), to the write head 30.

The waveform acquisition unit 52 is configured to acquire a waveform of the servo signal from a servo signal (analog electric signal) read out by the read head 40 (the servo signal read element SR thereof). The servo signal represented in thus-acquired waveform will hereinafter be referred to simply as "readout signal". Optionally, the analogue servo signal may be converted into a digital signal, where necessary.

Figure 3B:
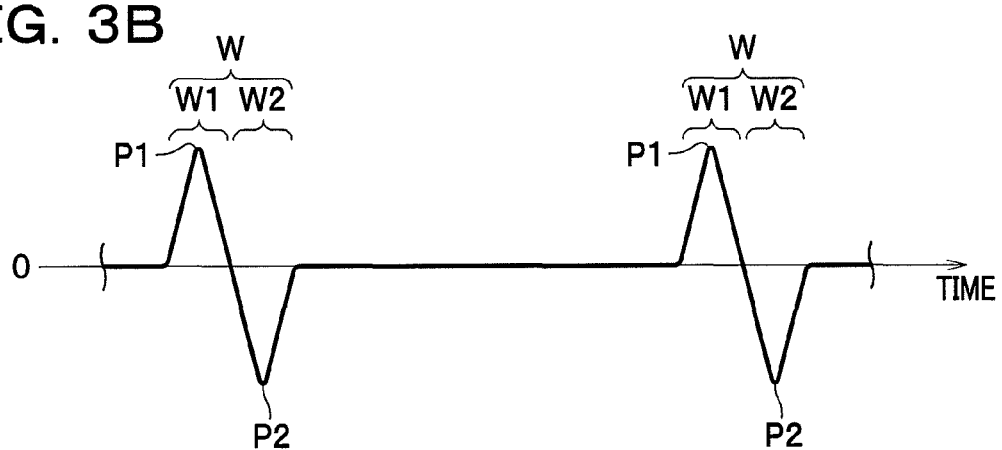
FIG. 3B is a diagram showing a readout signal obtained by reading out a servo signal.

As shown in FIG. 3B, the readout signal has a waveform in which a unit waveform W having a pair of peaks P1, P2 of opposite polarities corresponding to the magnetic pattern MP appears periodically. The unit waveform W is composed of a crest portion W1 containing a positive peak P1 corresponding to a front component M1 read out earlier by the servo signal read element SR, and a trough portion W2 containing a negative peak P2 corresponding to a rear component M2 read out later (subsequent to the front component M1) by the servo signal read element SR The waveform selection unit 53 is configured to select a specific portion from each unit waveform W contained in the readout signal acquired by the waveform acquisition unit 52. To be more specific, the waveform selection unit 53 selects a trough portion W2 of the waveform containing the peak P2 that is identified as a portion (corresponding to the rear component M2) located rearwardly in the tape transport direction in a time of writing the servo signal, from each unit waveform W. The "tape transport direction in a time of writing the servo signal" refers to the direction in which the magnetic tape MT was being transported when the servo signal (magnetic pattern MP) was written by the write head 30 (the servo signal write element SW thereof).

More specifically, the servo writer according to the present embodiment is configured (i.e., the servo signal is written) such that the peak P2 corresponding to the rear component M2 appears at a negative side. Therefore, the trough portion W2 is extracted from each unit waveform W by determining (detecting) the position of the peak P2 through the process of matching performed for a predetermined reference waveform in the form of a trough. The rear component M2 is, as described above, written at the leading edge EL.

It is to be appreciated that detection of the position of the peak and selection of the waveform (containing the peak) may be performed in this order or in reverse order. That is, the present embodiment as described above is configured to perform the detection of the position of the peak P2 and the selection of the trough portion W2 of the waveform (containing the peak P2) at the same time, but the present invention is not limited to this specific configuration. The process applicable may be, for example, either of the following: detecting the positions of a pair of peaks and thereafter selecting one of the peak (the waveform containing the peak); selecting a waveform containing the peak from the unit waveform and thereafter detecting (specifying) the position of the peak of the selected waveform.

The signal verification unit 54 is configured to verify the quality of the servo signal based on the selected portion (the trough portion W2) of the waveform. It is to be understood that the method of verification is not limited to any specific approach known in the art. Any known methods can be adopted without limitation. For example, the signal verification unit 54 may be configured to work out a PES (position error signal) as a measure of evaluation of the quality from the distance between adjacent peaks P2

Next, a method (servo signal verification method) for verifying (evaluating) the quality of a servo signal in a magnetic tape MT in which the servo signal is written by the write head 30 will be described in detail.

First, the read head 40 reads out a servo signal in a magnetic tape MT being transported, and outputs information (a readout signal) to the waveform acquisition unit 52, which in turns acquires a waveform of the readout signal as shown in FIG. 3B based on the information outputted from the read head 40 (waveform acquisition step).

Subsequently, the waveform selection unit 53 selects a trough portion W2 in a unit waveform W contained in the waveform of the readout signal acquired by the waveform acquisition unit 52 (waveform selection step).

Then, the signal verification unit 54 works out an evaluation value (e.g., PES) based on the tough portion W2 selected by the waveform selection n unit 53, and output s the evaluation value (signal verification step).

The inventors of the present invention have revealed that the variation in distances between peaks P2 of the trough portions W2 corresponding to the rear components M2 written at the leading edge is less than the variation in distances between peaks P1 of the crest portions W1 corresponding to the front components M1.

Figure 4A:
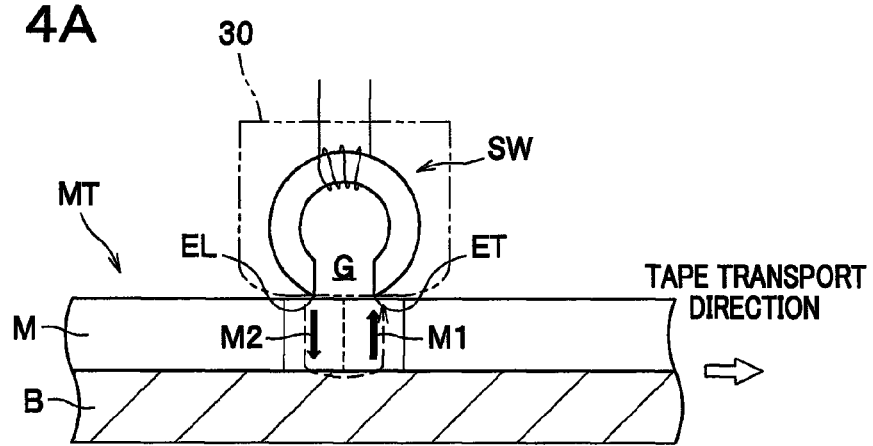
FIGS. 4A-4C are diagrams for explaining an effect of fluctuation in a tape transport direction.
Figure 4B:
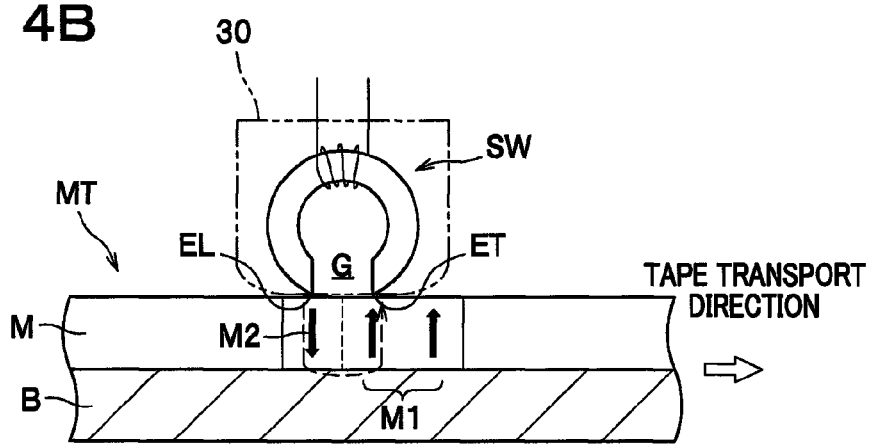
Figure 4C:
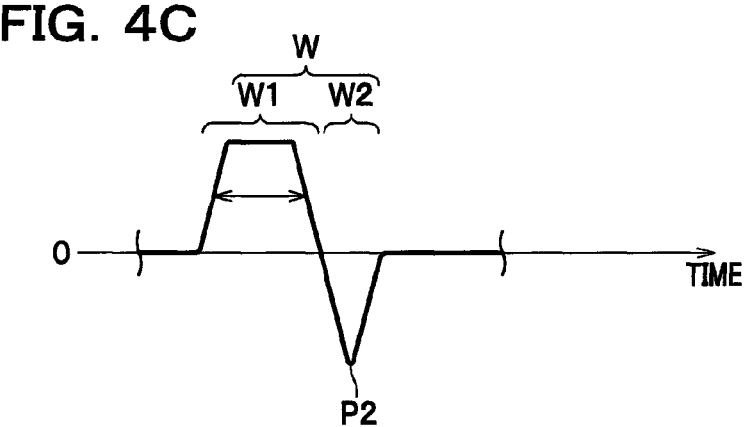

To illustrate, as shown in FIGS. 4A and 4B, fluctuations occurring in the direction of transport of the magnetic tape MT due to elongated current-carrying time in a time of writing the pulsed signal, for example would make a front component M1 written at the trailing edge ET longer in the tape transport direction.

As shown in FIGS. 4A and 4B, fluctuations would possibly occur in the tape transport direction for some reasons, for example, in that the current-carrying time (pulse width) of the pulsed signal that is being written in the running magnetic tape MT is extended, and a front component M1 written at the trailing edge ET would resultantly become longer in the tape transport direction. In such an occasion, the waveform of a readout signal acquired by reading the servo signal would include more than one unit waveform having a crest portion W1 of which a pulse width is extended (i.e., the unit waveform written when the current-carrying time of the pulsed signal is extended). This would result in an undesirable shift in the relative position of the peaks of the crest portion W1 (making the servo signal blurred), so that the distances between peaks P1 would vary.

In contrast, a rear component M2 written at the leading edge EL would not become longer in the tape transport direction even if fluctuations would occur in the tape transport direction, because the magnetic tape MT is magnetized in the opposite thickness direction at the trailing edge ET located downstream of the leading edge EL so that the front component M2 overwrites the extended portion of the rear component M1. Therefore, the length of the rear component M2 in the tape transport direction is substantially constant, and thus the trough portion W2 of the waveform of the readout signal acquired by reading out the servo signal is stable in its pulse width. As a result, the positions of the peaks of the trough portion W2 vary less, and thus the distances between peaks P2 vary less than the distances between peaks P1. In other words, the trough portion W2 containing the peak P2 is less subject to fluctuations in the tape transport direction in the time of writing a servo signal.

In the present embodiment, a waveform containing the peak P2 (i.e., the trough portion W2) is selectively used (extracted from each unit waveform W in the readout signal and used) for verification of the quality of the servo signal. Therefore, the effect of fluctuation in the tape transport direction in which the magnetic tape MT is transported when the servo signal is being written therein can be suppressed. Consequently, with the servo writer 1A according to the present embodiment, and with the servo signal verification method according to the present embodiment, the evaluation (verification) of the quality of the servo signal written in the magnetic tape MT can be performed with increased accuracy.

In the present embodiment, the servo writer 1A is configured to include means for verifying the quality of a servo signal (i.e., working out a value of evaluation of the quality of the servo signal), but the present invention is not limited to this specific configuration. In accordance with the present invention, a verification apparatus for verifying a magnetic tape with a servo signal written therein by a servo writer known in the art is conceivable. In this alternative embodiment, for example, the verification apparatus may be configured to be provided exclusively for a magnetic tape with a servo signal written therein such that its rear peak is a negative peak so that a waveform can be identified by matching performed with a predetermined reference waveform in the form of a trough. Alternatively, an identifier for identifying the waveform containing the rear peak by determining which of the crest or trough portions of one unit waveform is at the rear in the time of writing a servo signal may be recorded beforehand, in the magnetic tape (e.g., in its servo band) or in an IC memory equipped in the magnetic tape cartridge or anywhere like that, so that an appropriate waveform can be selectively used by reading this identifier (information).

Second Embodiment

A second embodiment will now be described with reference made particularly to FIGS. 5 and 6. This embodiment focuses on a structure of a magnetic tape drive and a magnetic head tracking control method. In the following discussion, the same elements as in the first embodiment described above will be designated by the same reference numerals, and a duplicate description will be omitted.

Figure 5:
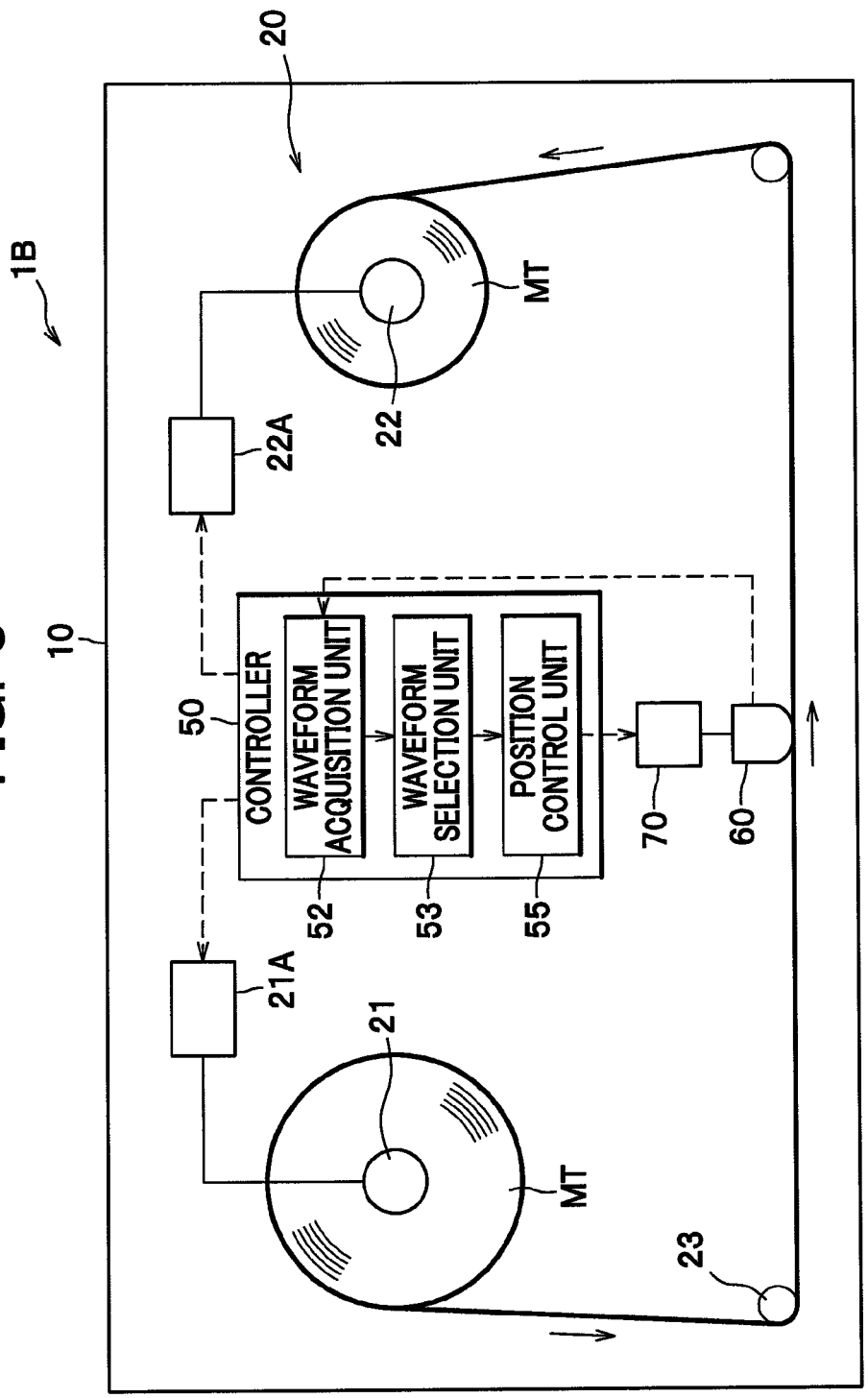
FIG. 5 is a schematic diagram showing a structure of a magnetic tape drive.
Figure 6:
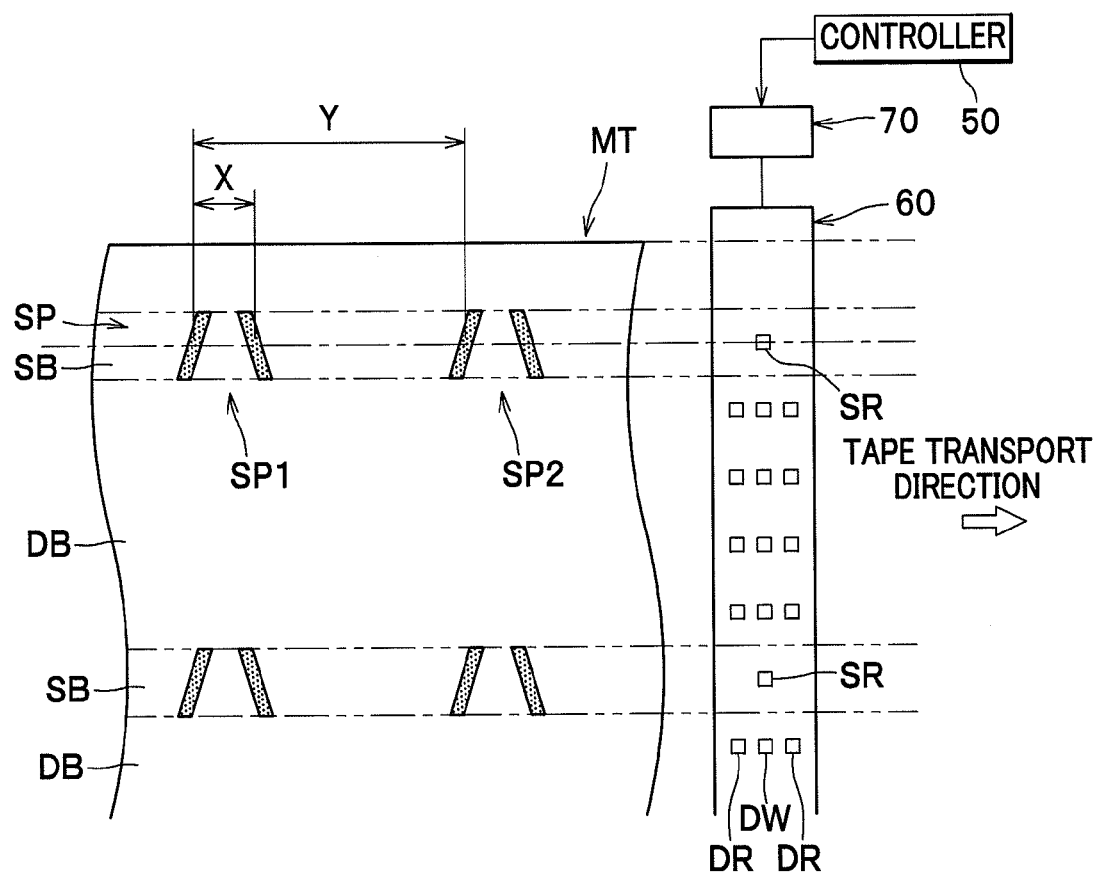
FIG. 6 is a plan view of a magnetic tape and a magnetic head.

As shown in FIG. 5, a magnetic tape drive 1B is an apparatus which records and retrieves information in a perpendicular recording-type magnetic tape with a servo signal written therein, in which servo signal a magnetic pattern MP (see FIG. 2) is repeatedly arranged in a tape transport direction at predetermined intervals. The magnetic tape drive 1B includes a base 10, and various components mounted on the base 10, which includes a magnetic tape transport system 20, a controller 50, a magnetic head 60, and an actuator 70.

The magnetic tape transport system 20 mainly includes a pair of reels 21, 22 and a plurality of guide rollers 23. The reel 21 is configured to be driven to rotate by a motor 21A, and the reel 22 is configured to be driven to rotate by a motor 22A. The reels 21, 22 and the motors 21A, 21B are configured to be rotatable in the normal and reverse directions, so that the magnetic tape MT can be transported in either one of the direction in which the magnetic tape MT is supplied from the reel 21 and taken up by the reel 22 (the direction indicated by an arrow in FIG. 5), and the direction in which the magnetic tape MT is supplied from the reel 22 and taken up by the reel 21.

The magnetic head 60 designed to have dimensions such that the magnetic head 60 covers an entire width of a magnetic tape MT (a magnetic layer M thereof), when the magnetic tape slides along the magnetic head 60. As shown in FIG. 6, the magnetic head 60 includes a data recording element DW as one example of a first element, a data retrieving element DR, and a servo signal read element SR as one example of a second element, all of which are disposed in relevant positions at a surface of the magnetic head 60 opposite to the magnetic tape MT; i.e., the data recording element DW and the data retrieving element DR are in a position corresponding to the data band DB, and the servo signal read element SR is in a position corresponding to the servo band SB.

The data recording element DW is a known element for recording data in the data band DB of the magnetic tape MT. The data retrieving element DR is a known element for retrieving (reading) data recorded in the data band DB of the magnetic tape MT.

The servo signal read element SR is an element (MR element in the present embodiment) for reading a servo signal, and disposed in a position corresponding to the position of the servo band SB.

The actuator 70 is a device which moves the magnetic head 60 in the direction of the width of the magnetic tape MT (the upward/downward direction in FIG. 6; hereinafter referred to simply as "tape width direction"). The actuator 70 may be a piezoelectric element, for example.

The controller 50 is a device configured to control the operation of the magnetic tape drive 1B. As shown in FIG. 5, the controller includes several functional units related to the inventive features of the present embodiment, such as a waveform acquisition unit 52, a waveform selection unit 53 and a position control unit 55.

The waveform acquisition unit 52 is configured to acquire, from a servo signal (servo pattern SP) read out by the servo signal read element SR, a waveform of the servo signal as shown in FIG. 3B.

The waveform selection unit 53 is configured to select a specific portion in each unit waveform W contained in the readout signal acquired by the waveform acquisition unit 52. To be more specific, the waveform selection unit 53 selects a trough portion W2 of the waveform containing the peak P2 that is a portion (corresponding to the rear portion M2) located rearwardly in the tape transport direction in a time of writing the servo signal, from each unit waveform W.

The position control unit 55 is configured to regulate a position in the tape width direction of the magnetic head 60 based on the selected portion of the waveform (i.e., trough portion W2). In the present embodiment, the method of position control for the magnetic head 60 is not limited to any specific approach; rather, any known methods can be adopted without limitation. For example, the position control unit 55 may be configured to perform the process steps which include: (1) calculating a ratio of a distance X to a distance Y where X is a distance between a pair of servo patterns SP1 (i.e., the distance between peaks P2 thereof) shown in FIG. 6, and Y is a distance between the left pattern of the pair of servo patterns SP1 and the left pattern of the next pair of servo patterns SP2 (i.e., the distance between peaks P2 thereof); and (2) calculating an amount of deviation in the tape width direction of the magnetic head 60 (of the servo signal read element SR thereof) based on the ratio calculated in step (1) and a predetermined reference value. The position control unit 55 is further configured to correct (regulate) the position of the magnetic head 60 by actuating the actuator 70 to move the magnetic head 60 in the tape width direction.

A method (magnetic head tracking method) of tracking control exercised in the magnetic tape drive 1B for causing the magnetic head 60 to follow a magnetic tape MT with a servo signal written therein will be described in detail.

First, the magnetic head 60 reads out a servo signal written in a running magnetic tape and outputs information (readout signal) to the waveform acquisition unit 52, which in turn acquires a waveform of the readout servo signal as shown in FIG. 3B based on the outputted information (waveform acquisition step).

Next, the waveform selection unit 53 selects a trough portion W2 in each unit waveform contained in the waveform of the readout signal acquired by the waveform acquisition unit 52 (waveform selection step).

Then, the position control unit 55 regulates the position of the magnetic head 60 in the tape width direction based on the trough portion W2 of the waveform selected by the waveform selection unit 53 (position control step). By executing these process steps, the data recording element DW can be accurately positioned relative to the data band DB in the recording operation, and the data retrieving element DR can be accurately positioned relative to the data band DB in the retrieving operation.

As described above, in the present embodiment, the portion (trough portion W2) of the waveform containing the peak P2 of which an inter-peak distance varies less than that of the peak P1 is selected from the waveform (each unit waveform W) acquired from the readout servo signal, and is used for the position control by which the position of the magnetic head 60 is regulated, and thus the disadvantageous effect of fluctuation in the tape transport direction which occurs during the servo signal writing operation can be suppressed. As a result, with the magnetic tape drive 1B and the magnetic head tracking method according to the present embodiment, the position of the magnetic head 60 can be regulated with increased accuracy and stability.

In the present embodiment, the magnetic tape drive 1B is configured to record and retrieve data in a magnetic tape MT, but the present invention is not limited to this specific configuration. It is to be understood that the magnetic tape drive may be configured to be only capable of recording data in a magnetic tape, or only capable of retrieving data from a magnetic tape.

Although two exemplary embodiments of the present invention have been described above, the present invention is not limited to these illustrative, non-limiting embodiments, and may be carried out into practice in various other ways. Thus, it is contemplated that various modifications and changes may be made to the exemplary embodiments of the invention without departing from the scope of the embodiments of the present invention as defined in the appended claims.

In the above-described embodiments, a magnetic tape MT (a magnetic layer M thereof) in which no servo signal has been written is not magnetized, but the present invention is not limited to this specific configuration. For example, the magnetic tape in which no servo signal has been written may be magnetized in one direction that is one of two longitudinal directions of the magnetic tape.

In the above-described embodiments, the illustrated process of writing a magnetic pattern MP in a magnetic tape MT which is performed by a servo signal write element SW includes the steps of magnetizing a magnetic layer M in the downward direction of FIG. 2 by a magnetic field induced at the leading edge EL, and magnetizing the magnetic layer M in the upward direction of FIG. 2 by a magnetic field induced at the trailing edge ET. It is to be understood that the directions of magnetization at the edges may be reversed.

In the above-described embodiments, a readout signal is shown of which the waveform corresponding to the front component M1 of the magnetic pattern MP appears at a positive side (i.e., as a crest portion of the waveform), and the waveform corresponding to the rear component M2 of the magnetic pattern MP appears at a negative side (i.e., as a trough portion of the waveform), but the present invention is not limited to this specific configuration. The readout signal may be such that its waveform corresponding to the front component M1 appears at a negative side (i.e., as a trough portion of the waveform), and the waveform corresponding to the rear component M2 appears at a positive side (i.e., as a crest portion of the waveform). In this alternative embodiment, the crest portion of the waveform is selected in the waveform selection step.

In the above-described embodiments, the distance between peaks P2 are determined for the evaluation (verification) of a servo signal (calculation of quality evaluation value) and the position control of the magnetic head 60 by way of example, but it is to be understood that the "peaks" are not limited to their maximums or minimums. For example, the peaks may be determined by detecting the most relevant timing to a predetermined reference waveform from the trough (or crest) portion of the waveform selected in the waveform selection step (by the waveform selection unit).

EXAMPLES

Some examples are represented for further explanation, which has shown that variation in distances between peaks P2 of the trough portions W2 corresponding to the rear component M2 written at the leading edge EL is less than that in distances between peaks P1 of the crest portions W1 corresponding to the front component M1 written at the trailing edge ET.

<Method of Experiments>

A servo pattern conforming to LTO standard was written in a perpendicular magnetic recording-type magnetic tape, using a servo writer including a write head having a magnetic gap of 1 micrometer.

The current-carrying time of the pulsed signal used in the writing operation is changed: 31 ns, 63 ns, 104 ns, 130 ns.

After a servo signal is written, the positions in the servo patterns which form the smallest intervals (5 micrometers) were detected by a verification head provided downstream of the write head, and the distances between peaks of the obtained readout signal were determined. Detection of peaks from a unit waveform contained in the readout signal was made by sampling the output values as digital values at 100 MHz, then calculating their points of inflection, and approximating a quadric curve from neighborhood points of the points of inflection, thereby identifying the peak positions.

Measurement of the distances of peaks was performed twice, for determining the distances of the peaks P1 and for determining the distances of the peaks P2. Thereafter, the standard deviation of distribution of the differences between each measured distance and the reference distance (5 micrometers) (i.e., deviation of measured distances from the reference distance) was calculated, and plotted for the current-carrying time of the pulsed signal used in the writing operation. The results are shown in FIG. 7.

<Results>

Figure 7:
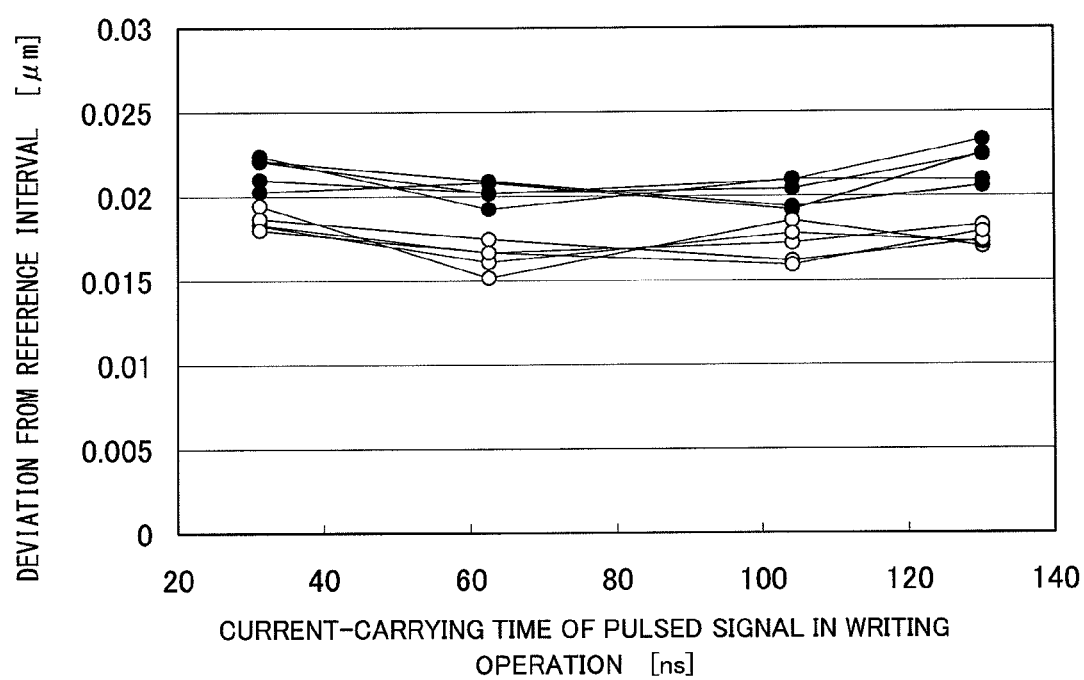
FIG. 7 is a graph showing the effect of fluctuation in the tape transport direction in the servo signal writing operation.

It is confirmed from FIG. 7 that the distances between the peaks P2 indicated by hollow circles vary less than the distances between the peaks P1 indicated by filled-in circles. Change in the current-carrying time of the pulsed signal in this example (experiment) is intended to simulate fluctuation in the tape transport direction during the servo signal writing operation, and the peaks P2 (rear component M2 written at the leading edge EL) which vary less should be considered to be less subject to the fluctuation in the tape transport direction. It is thus to be concluded that the effect of fluctuation in the tape transport direction during the servo signal writing operation can be suppressed by selectively utilizing the portion of the waveform containing the peaks P2 for the servo signal verification or for the magnetic head tracking control.

What is claimed is:

1. A tracking control method for causing a magnetic head to follow a perpendicular recording-type magnetic tape with a servo signal written therein, in which servo signal a magnetic pattern is repeatedly arranged in a longitudinal direction of the magnetic tape at predetermined intervals, the magnetic pattern being composed of a first portion magnetized in one direction that is one of two opposite thickness directions and a second portion magnetized in a direction opposite to the one direction, the method comprising the steps of:

reading out the servo signal and acquiring, from the read-out servo signal, a waveform of the servo signal in which a unit waveform having a pair of peaks of opposite polarities corresponding to the magnetic pattern appears periodically, the unit waveform being composed of a crest portion and a trough portion;

selecting, from between the crest portion and the trough portion of the unit waveform contained in the acquired waveform of the servo signal, a portion of the waveform containing one of the peaks located rearwardly in a tape transport direction in a time of writing the servo signal; and regulating a position of the magnetic head based on the selected portion of the waveform.

2. A method for verifying quality of a servo signal written in a perpendicular recording-type magnetic tape, in which servo signal a magnetic pattern is repeatedly arranged in a longitudinal direction of the magnetic tape at predetermined intervals, the magnetic pattern being composed of a first portion magnetized in one direction that is one of two opposite thickness directions and a second portion magnetized in a direction opposite to the one direction, the method comprising the steps of:

reading out the servo signal and acquiring, from the read-out servo signal, a waveform of the servo signal in which a unit waveform having a pair of peaks of opposite polarities corresponding to the magnetic pattern appears periodically, the unit waveform being composed of a crest portion and a trough portion, the unit waveform being composed of a crest portion and a trough portion;

selecting, from between the crest portion and the trough portion of the unit waveform contained in the acquired waveform of the servo signal, a portion of the waveform containing one of the peaks located rearwardly in a tape transport direction in a time of writing the servo signal; and verifying the quality of the servo signal based on the selected portion of the waveform.

3. A magnetic tape drive for recording and/or retrieving information in a perpendicular recording-type magnetic tape with a servo signal written therein, in which servo signal a magnetic pattern is repeatedly arranged in a longitudinal direction of the magnetic tape at predetermined intervals, the magnetic pattern being composed of a first portion magnetized in one direction that is one of two opposite thickness directions and a second portion magnetized in a direction opposite to the one direction, the magnetic tape drive comprising:

a magnetic head including a first element configured to record and/or retrieve information in the perpendicular recording-type magnetic tape, and a second element configured to read out the servo signal;

a waveform acquisition unit configured to acquire, from the servo signal read out by the second element, a waveform of the servo signal in which a unit waveform having a pair of peaks of opposite polarities corresponding to the magnetic pattern appears periodically, the unit waveform being composed of a crest portion and a trough portion;

a waveform selection unit configured to select, from between the crest portion and the trough portion of the unit waveform contained in the waveform of the servo signal acquired by the waveform acquisition unit, a portion of the waveform containing one of the peaks located rearwardly in a tape transport direction in a time of writing the servo signal; and a position control unit configured to regulate a position of the magnetic head based on the crest or trough portion of the waveform selected by the waveform selection unit.

4. A servo writer for writing a servo signal in a perpendicular recording-type magnetic tape, in which servo signal a magnetic pattern is repeatedly arranged in a longitudinal direction of the magnetic tape at predetermined intervals, the magnetic pattern being composed of a first portion magnetized in one direction that is one of two opposite thickness directions and a second portion magnetized in a direction opposite to the one direction, the servo writer comprising:

a write head configured to write the servo signal in the perpendicular recording-type magnetic tape;

a signal output unit configured to output a pulsed signal to the write head;

a read head provided in a position downstream relative to the write head along a path traveled by the perpendicular recording-type magnetic tape, the read head being configured to read out a servo signal;

a waveform acquisition unit configured to acquire, from the servo signal read out by the read head, a waveform of the servo signal in which a unit waveform having a pair of peaks of opposite polarities corresponding to the magnetic pattern appears periodically, the unit waveform being composed of a crest portion and a trough portion;

a waveform selection unit configured to select, from between the crest portion and the trough portion of the unit waveform contained in the waveform of the servo signal acquired by the waveform acquisition unit, a portion of the waveform containing one of the peaks located rearwardly in a tape transport direction in a time of writing the servo signal; and a signal verification unit configured to verify a quality of the servo signal based on the crest or trough portion of the waveform selected by the waveform selection unit.

5. A tracking control method for causing a magnetic head to follow a perpendicular recording-type magnetic tape with a servo signal written therein, in which servo signal a magnetic pattern is repeatedly arranged in a longitudinal direction of the magnetic tape, the magnetic pattern having a first portion magnetized in one direction that is one of two opposite thickness directions and a second portion magnetized in a direction opposite to the one direction, the method comprising the steps of:

acquiring a position of one of the first portion and the second portion located rearwardly in a tape transport direction in a time of writing the servo signal; and regulating a position of the magnetic head based on the position of the one of the first portion and the second portion acquired.

* * * * *